United States Patent [19]

Clark et al.

[11] 4,381,664
[45] May 3, 1983

[54] METHODS OF AND APPARATUS FOR THE DETECTION OF AIRBORNE PARTICLES

[75] Inventors: Raymond P. Clark, London; William V. Hunt, Lytchett Matravers, both of England

[73] Assignee: Watkins and Watson Limited, Dorset, England

[21] Appl. No.: 206,665

[22] Filed: Nov. 13, 1980

[30] Foreign Application Priority Data

Nov. 13, 1979 [GB] United Kingdom ............... 7939244

[51] Int. Cl.³ ............................................. G01M 3/20
[52] U.S. Cl. .................................... 73/40.7; 239/215
[58] Field of Search ................ 73/40.7; 239/214, 215, 239/222.11

[56] References Cited

U.S. PATENT DOCUMENTS

| | | | |
|---|---|---|---|
| 1,517,144 | 11/1924 | Anderson | 73/28 |
| 2,182,897 | 12/1939 | Loepsinger | 239/222.11 |
| 3,460,125 | 8/1969 | Lieberman | 73/40.7 |
| 3,522,724 | 8/1970 | Knab | 73/40.7 |
| 3,645,127 | 2/1972 | Mongodin | 73/40.7 |
| 4,055,075 | 10/1977 | Allan | 73/40.7 |
| 4,155,249 | 5/1979 | Scott | 73/40.7 |
| 4,259,080 | 3/1981 | Wunderlin | 73/40.7 |

FOREIGN PATENT DOCUMENTS

1475185 1/1969 Fed. Rep. of Germany ...... 239/215

*Primary Examiner*—S. Clement Swisher
*Attorney, Agent, or Firm*—Steele, Gould & Fried

[57] ABSTRACT

A method of measuring the containment efficiency of a biological safety cabinet comprises releasing an aerosol of identifiable droplets within the cabinet and then sampling ambient air in the proximity of the cabinet so as to determine if particles of said droplets have escaped from the cabinet. Apparatus for producing a suitable aerosol comprises an impeller rotatable about an upright axis, an electric motor for rotating the impeller at high speed, (e.g. 20,000 to 30,000 r.p.m.), a reservoir for potassium iodide aerosol solution disposed above the impeller, and a hypodermic needle for providing a controlled flow of aerosol solution from the reservoir to the impeller, whereby rotation of the impeller disperses particles of the aerosol solution.

10 Claims, 17 Drawing Figures

METHODS OF AND APPARATUS FOR THE DETECTION OF AIRBORNE PARTICLES

BACKGROUND OF THE INVENTION

This invention relates to methods of, and apparatus for, the detection of airborne particles.

The present invention is particularly, but not exclusively, concerned with measuring the containment efficiency of biological safety cabinets, to at least official (e.g. British Standard) requirements.

As used herein, the term "biological safety cabinet" includes fume cupboards, glove-boxes, and similar containments.

SUMMARIES OF THE INVENTION

According to one aspect of the present invention, a method of measuring containment efficiency comprises releasing an aerosol of identifiable droplets within the containment area and then sampling ambient air in the proximity of the area so as to determine if particles of said droplets have escaped from the area.

Apparatus for producing a suitable aerosol comprises an impeller rotatable about an upright axis, driving means for rotating the impeller at high speed, a reservoir for aerosol solution disposed above the impeller, and means for supplying a controlled flow of aerosol solution from the reservoir to the impeller, whereby rotation of the impeller disperses particles of the aerosol solution.

According to yet another aspect of the present invention, apparatus for determining the presence of identifiable particles in air comprises a casing, air induction means disposed within the casing, and air sampling means storable within the casing and operable to collect any of said particles in air gathered by said air induction means.

Other aspects of the present invention are present in the disclosures of this application, for example, the invention can be used to quantify the effectiveness of air conditioning systems installed in industrial clean areas. Also medical clean areas, for example, operating theatres and burns wards as well as special containment facilities such as carcinogen, genetic manipulation, radio-pharmaceutical suites and isolation buildings.

Furthermore, the invention can be used to quantify product protection factors afforded by safety cabinets. In such cases the spray generator (i.e. aerosol producer) is placed within a cabinet, and the air sampling means outside the cabinet. Cross contamination test may also be performed by the invention, in which case the spray generator and the air sampling means are placed within the cabinet.

BRIEF DESCRIPTION OF THE DRAWINGS

The various aspects of the invention will now be described, by way of example only, with reference to the accompanying drawings, wherein.

In the figures, like reference numerals refer to like components.

DETAILED DESCRIPTION OF THE PREFERRED EMBODIMENT

Figure 1:
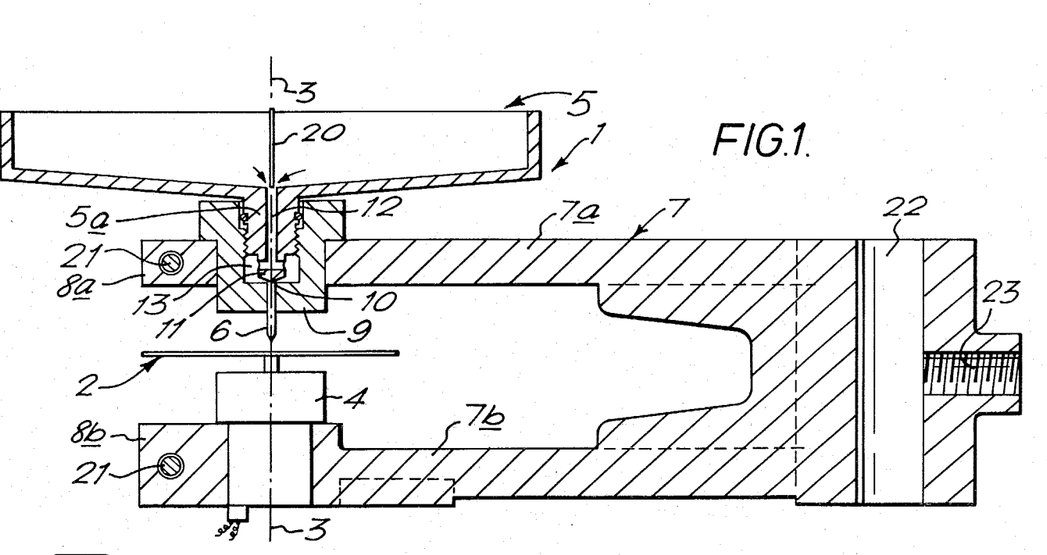
FIG. 1 is a side view, in medial section, of apparatus for producing a suitable aerosol.

With reference to FIG. 1, apparatus 1 for producing a suitable aerosol comprises an impeller 2 of disc from rotatable about a substantially vertical axis 3, driving means in the form of an electric motor 4 for rotating the impeller 2 at high speed, (e.g. 20/30,000 r.p.m.), a bowl-shaped reservoir 5 for aerosol solution disposed directly above the impeller and means including a small-bore, i.e. hypodermic needle 6, for supplying a controlled flow of aerosol solution from the reservoir 5 to the impeller 2, whereby rotation of the impeller disperses particles of the aerosol solution in the surrounding air. The impeller 2 is of "MELINEX" (Trade Mark) material.

The reservoir 5, impeller 2 and motor 4, are all supported by a body 7 with upper and lower bifurcated arms 7a, 7b, formed with clamps 8a, 8b at their "free" ends.

Clamp 8a releasably retains a reservoir support member 9 of hollow form, the interior of which is formed with a female screw-thread. The lower end of the reservoir 5 is provided with a spigot-like extension 5a, the exterior of which is formed with a male screw-thread. The screw-threaded portions of the member 9 and extension 5a interengage.

The lower end of the member 9 carries the needle 6 which is disposed lengthwise on an upright axis 3. Solution enters the upper end of the needle 6 by way of a valve means comprising a valve seat 10 formed in the member 9, the lower end of extension 5a being pointed so as to form a co-operating valve 11. A duct 12 of inverted "T"-shape is formed in the extension 5a whereby solution passes from the reservoir 5 into the upper end of the needle 6 by way of a chamber 13, formed in the interior of the member 9. Flow through the needle 6 is controlled by rotating the reservoir 5 within the (stationary) member 9 so as to adjust the relative position of the valve means 10/11.

A fine-bore tube 20 is disposed in the upper end of the duct 12, but with sufficient clearance therewith to allow solution to flow downwardly between the tube 20 and the all of the duct. The tube 20 provides a bleed for the entry of air into the duct 12.

The bottom clamp 8b is used to releasably retain the electric motor 4 which is powered by a transformer (not shown) connectable to a mains supply.

Figure 2:
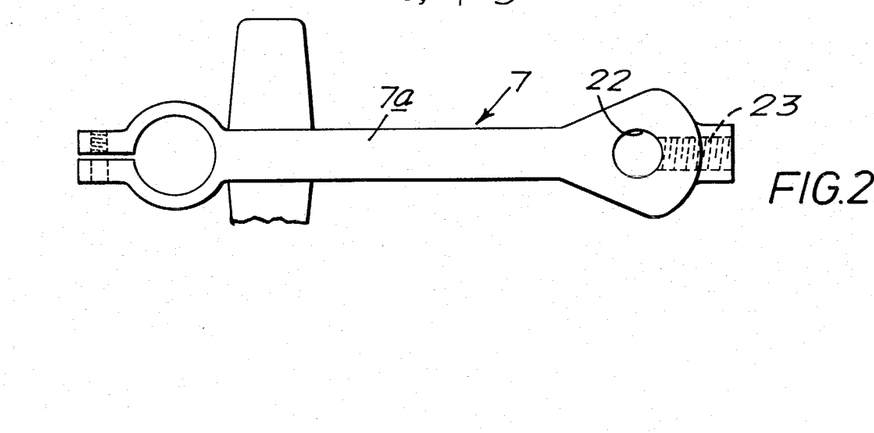
FIG. 2 is a plan view of the body 7 thereof.

The clamps 8a, 8b make use of "ALLEN" (Register Trade Mark) screws 21. The body 7 is formed with a support hole 22 and "ALLEN" clamp screw 23.

Figures 5, 9:
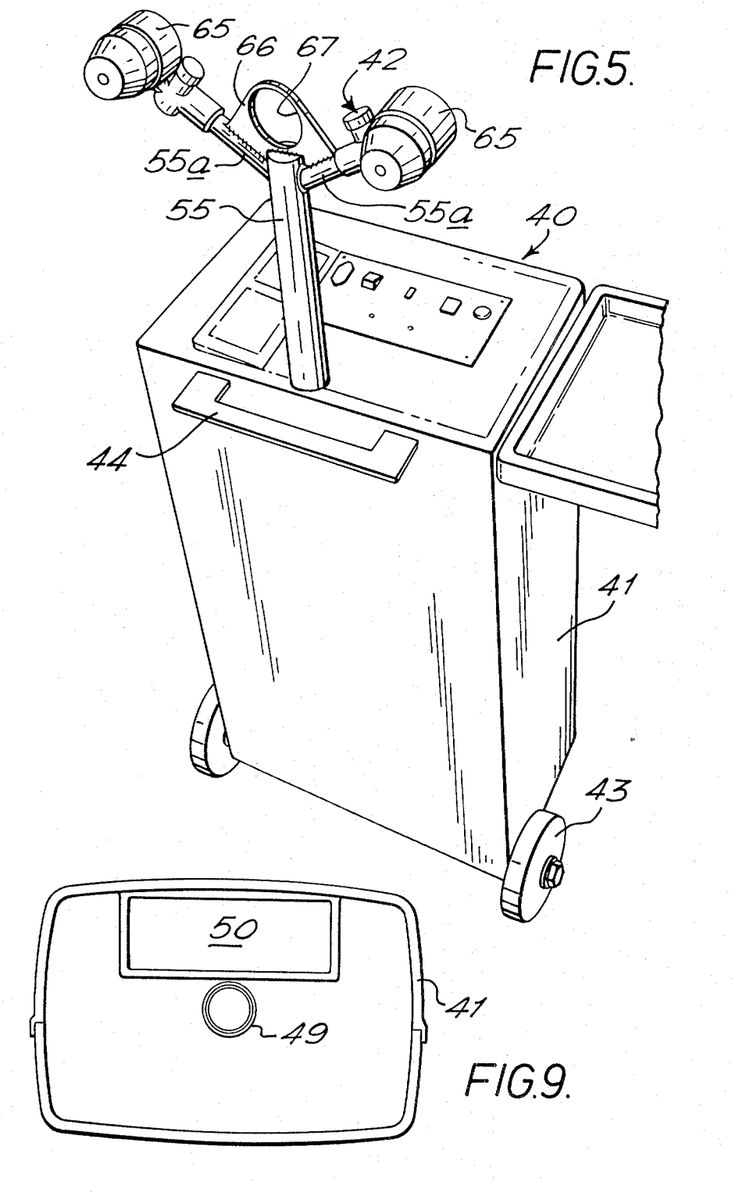
FIG. 5 is a view in perspective, of portable apparatus 40 for determining the presence of identifiable particles in the air.
FIGS. 7, 8 and 9 are sections taken on the lines VII—VII, VIII—VIII and IX—IX of FIG. 6.
Figure 6:
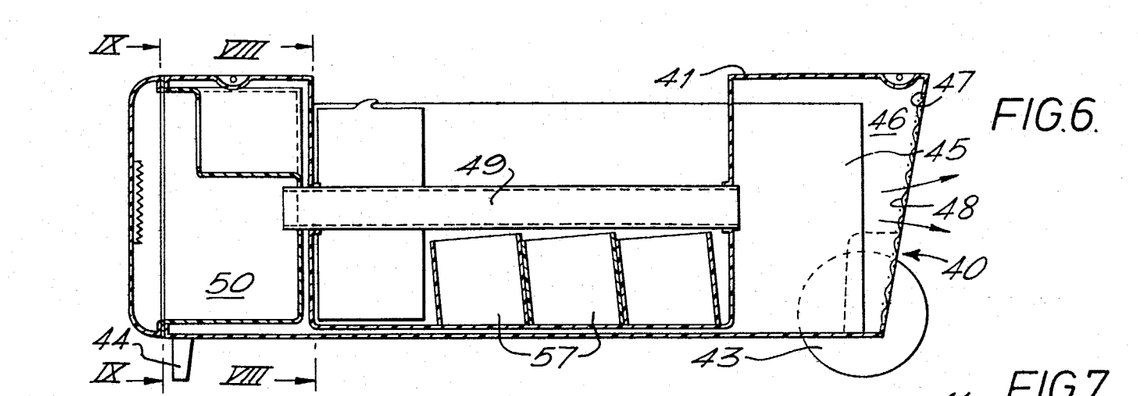
FIG. 6 is a side view, in medial section, of the apparatus 40.

With reference now to FIGS. 5 and 6, apparatus 40 for determining the presence of identifiable particles in air comprises a casing 41, air inducting means in the form of a suction fan unit 45 (FIG. 6 only) disposed within the lower part of the casing 41, and air sampling means 42 storable, (as explained hereinafter), within the casing 41, and operable to collect any of said particles in air gathered by the air induction means.

Figure 3:
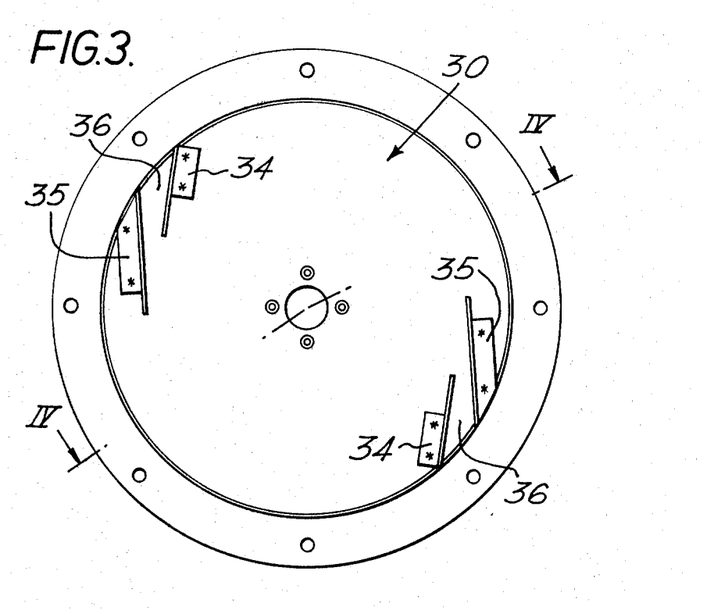
FIG. 3 is a plan view of the impeller employed by the fan unit 45 of FIG. 6.
Figure 4:
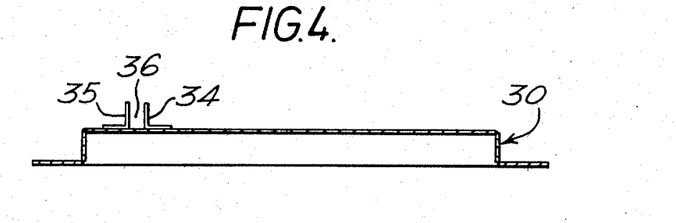
FIG. 4 is a section taken on the lines III—III of FIG. 3.

With added reference to FIGS. 3 and 4, the fan unit 45 makes use of a fan or impeller 30. The impeller 30 is of top hat section and has upstanding vanes 34, 35 attached to its upper surface so as to form diverging channels 36.

Figure 7:
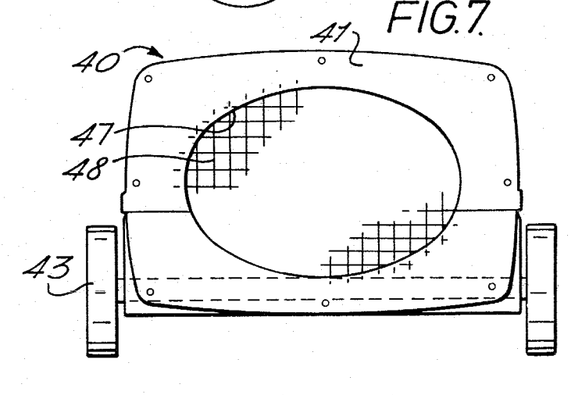
Figure 8:
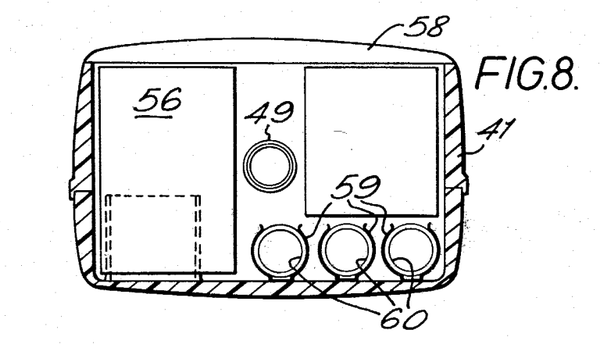

With reference now to FIGS. 7, 8 and 9, the casing 41, (which preferably comprises one or more mouldings of plastics material), is provided with a pair of ground-engaging wheels 43, so as to render the apparatus 40 portable. Transport of the apparatus is assisted by a handle 44.

The casing 41 is hollow. The lower part of the casing 41 is divided internally to form a fan chamber 46. Air is drawn into the fan unit 45 by its impeller 30, (FIGS. 3 and 4), and is discharged to atmosphere by way of an aperture 47 covered by a grill 48. The fan unit 45 is mains-powered and operates at 8 inches s.w.g.

A tube 49 extends lengthwise through the centre of the casing 41 to serve as an inlet duct for the fan unit 45. The upper end of the tube 49 terminates in a recess 50, formed in the upper end of the casing 41.

The tube 49 also forms part of a telescopic support for the air sampling means 42. The means 42 makes use of a tubular support 55 which is a sliding fit in the tube 49.

The side of the casing 41 opposite the handle 44 is openable so as to gain access to drawers 56 and compartments 57. The side can be closed off by a door 58. (Or removable panel).

With reference to FIG. 8, the door 58 also allows access to spring clips 59 for releasably supporting interfitting tubes 60 which serve as an artificial arm. (See below).

In addition to the tube 55, the air sampling means 42 comprise a pair of air sensors 65 mounted in branches 55a (FIG. 5) formed at the upper end of the tube 55. The upper end of tube 55 also carries an upright-disposed plate 66 with a central aperture 67. The aperture 67 is used to support the tubes 60 which together simulate a human arm.

Figure 10:
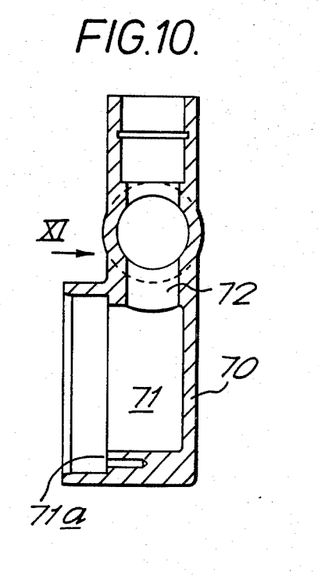
FIG. 10 is a side view, in medial section, of the body of a sensor 65.
Figure 11:
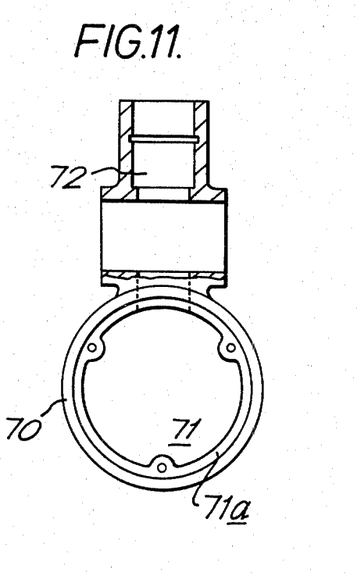
FIG. 11 is a front view thereof.

FIGS. 10 and 11 illustrate the body 70 of one of the sensors 65. The body 70 comprises an internal chamber 71 connectable, by an internal duct 72, to the inlet of the fan unit 45, by way of tubes 55 and 49.

The chamber 71 has a landing 71a which supports a sensor diaphragm 75 (FIG. 16) with a central hole 76.

Figure 12:
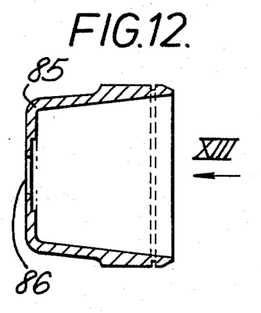
FIG. 12 is a side view, in medial section, of the head of a sensor 65.
Figure 13:
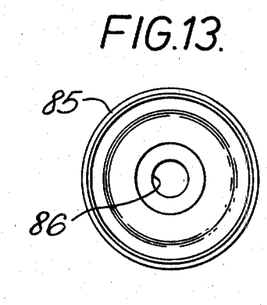
FIG. 13 is a front view of the head.

With reference to FIGS. 12 to 16, a sensor cone 80 (FIG. 14) together with filter membrane/holder 81, (FIG. 15), attached thereto by screws 82, rests on top of the diaphragm 75, (FIG. 16), and the cone 80 is removably covered by a head 85. (FIGS. 12 and 13). The head 85 has an inlet aperture 86.

In use, to test the containment efficiency of a biological safety cabinet, potassium iodide solution is placed in the reservoir 5 of the apparatus 1. With the needle valve 11/valve seat 10 spacing suitably adjusted, the apparatus 1 is placed in the cabinet and the motor 4 started. As solution falls from the needle 6 on to the spinning impeller 2, particles of the solution are dispersed to form an aerosol. (The air bleed tube 20 assists this dispersion).

Outside the cabinet, the fan unit 45 is used to draw in air from the proximity of the cabinet and through the sensors 65. This air is drawn through the filter membrane/holder 81, (FIG. 15), of the sensors 65 by way of the apertures 86 in the heads 85 thereof.

The sensors 65 are constructed so that a centripetal effect, (afforded by cones 80), results in a high capture efficiency for any particles of the aerosol escaping from the cabinet.

The artificial arm provided by the interfitting tubes 60 can be disposed in the cabinet opening to simulate the arm of a Laboratory Technician. (See British Standard 5726).

Any challenge particles deposited on the filter membrane are subsequently identified by and quantified by "developing" the membranes in palladium chloride solution which causes the deposited particles to form well-defined, easily counted spots. The developed membranes may then be stored so as to be available for checking and for comparison with later tests.

Several, (e.g. five), consecutive tests of a cabinet are preferred. Each test, together with development of the filter membranes, can be completed within 10 to 15 minutes.

Agents other than potassium iodide solutions may be used, if suitable.

Figures 14, 15, 16, 17:
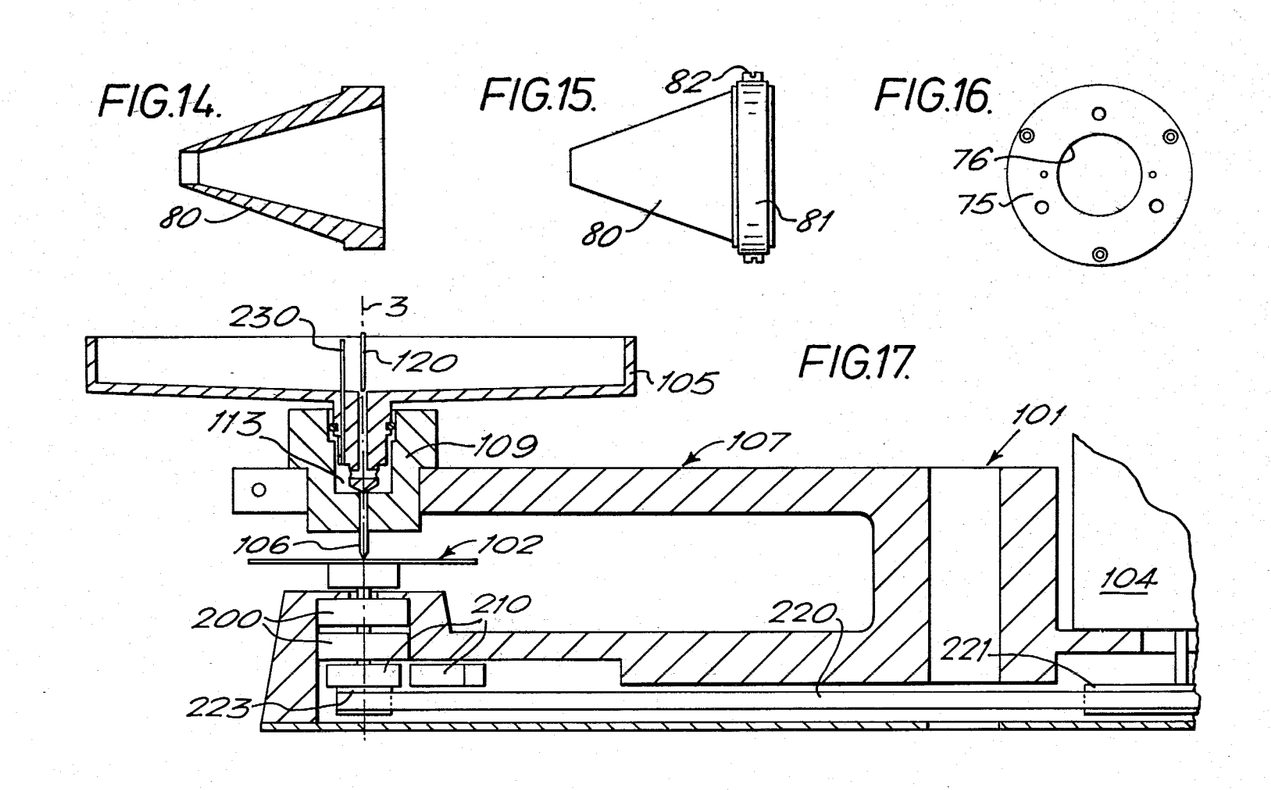
FIGS. 14 and 15 are side views, (FIG. 14 being in medial section), of an internal cone for a sensor 65.
FIG. 16 is a plan view of an internal diaphragm for the sensor 65.
FIG. 17 is a view similar to that provided by FIG. 1, and illustrates a modification of the apparatus shown therein.

With reference to FIG. 17, in the case of the modification illustrated thereby, the impeller 102 is driven by motor 104 in an indirect manner. An endless belt 220 extends between sprockets 221 and 223 on the shafts of motor 104 and impeller 102 respectively. The shaft of impeller 102 is located by bearings 200. Speed of the shaft is adjusted automatically by co-operating optical/electronic speed control components 210 which are operable so as to adjust the speed of motor 104, using electronic counter means.

An additional or alternative air bleed is provided by a tube 230, the lower end of which connects with chamber 113.

The invention can be used to quantify the effectiveness of air conditioning systems installed in industrial and medical clean areas, for example, operating theatres and burns wards, as well as special containment facilities such as carcinogen, genetic manipulation, radiopharmaceutical suites and isolation buildings.

Furthermore, the invention can be used to quantify product protection factors afforded by safety cabinets. In such cases the spray generator, (i.e. aerosol producer), is placed within a cabinet, and the air sampling means outside the cabinet. Cross contamination tests may also be performed by the invention, in which case the spray generator and the air sampling means are placed within the cabinet.

We claim:

1. Apparatus for producing an aerosol for measuring containment efficiency, comprising:
    an impeller rotatable about an upright axis and having an upwardly facing surface;
    driving means for rotating the impeller at high speed;
    a reservoir for aerosol solution disposed at a higher level than the impeller; and,
    means for supplying a controlled flow of aerosol solution from the reservoir to the impeller, the solution falling onto the impeller along the upright axis from a point close to the impeller, whereby rotation of the impeller outwardly disperses particles of the aerosol solution.

2. Apparatus as claimed in claim 1, wherein the means for supplying the controlled flow of solution comprises a hypodermic needle disposed lengthwise on the upright axis, the needle outlet being close to the impeller surface.

3. Apparatus as claimed in claim 2, wherein the reservoir is rotatable and solution enters the upper end of the needle by way of a valve means adjustable to control flow to the needle by rotation of the reservoir.

4. Apparatus as claimed in claim 2, in combination with apparatus for determining the presence of said particles in air.

5. The combination of claim 4, wherein the apparatus for determining the presence of said particles in air comprises a casing, air inducting means disposed within the casing, and air sampling means operable to collect any of said particles in air gathered by the air induction means.

6. The combination of claim 5, wherein the air inducting means comprise a fan unit.

7. The combination of claim 5, wherein the air sampling means are storable within the casing.

8. The combination of claim 5, wherein the air sampling means comprise air sensor means mounted on branches formed at the upper end of a tubular support connected to the air inducting means.

9. Apparatus for determining the presence of identifiable particles in air, comprising:
 a casing;
 air induction means disposed within the casing; and,
 air sampling means storable within the casing and operable to collect any of said particles in air gathered by said air induction means, said air sampling means comprising air sensor means mounted on branches formed at one end of a tubular support, the other end of which is connected to the air induction means.

10. Apparatus as claimed in claim 1, wherein the means for supplying a controlled flow of aerosol solution is unpressurized, the solution flowing from the reservoir, and onto the impeller only under the influence of gravity.

* * * * *

UNITED STATES PATENT AND TRADEMARK OFFICE
CERTIFICATE OF CORRECTION

PATENT NO. : 4,381,664
DATED : 5/3/83
INVENTOR(S) : Clark et al.

It is certified that error appears in the above—identified patent and that said Letters Patent are hereby corrected as shown below:

Column 2, line 28, delete "from" and insert --form--.
Column 2, line 67, delete "all" and insert --wall--.

Signed and Sealed this

Eighth Day of May 1984

[SEAL]

Attest:

GERALD J. MOSSINGHOFF

Attesting Officer  Commissioner of Patents and Trademarks